(12) United States Patent
Sengupta et al.

(10) Patent No.: US 10,671,444 B2
(45) Date of Patent: Jun. 2, 2020

(54) SYSTEMS AND METHODS FOR SCHEDULING TASKS AND MANAGING COMPUTING RESOURCE ALLOCATION FOR CLOSED LOOP CONTROL SYSTEMS

(71) Applicant: Tata Consultancy Services Limited, Mumbai (IN)

(72) Inventors: Siddhartha Sengupta, Mumbai (IN); Sudhir Radhakrishna Shetiya, Mumbai (IN); Nishant Kumar Agrawal, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/097,215

(22) PCT Filed: Mar. 21, 2017

(86) PCT No.: PCT/IB2017/051618
§ 371 (c)(1),
(2) Date: Oct. 26, 2018

(87) PCT Pub. No.: WO2018/104799
PCT Pub. Date: Jun. 14, 2018

(65) Prior Publication Data
US 2019/0286478 A1 Sep. 19, 2019

(30) Foreign Application Priority Data

Dec. 7, 2016 (IN) .............................. 201621041855

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/505* (2013.01)

(58) Field of Classification Search
CPC ....... G06F 9/4881; G06F 9/505; G06F 9/5083
(Continued)

(56) References Cited

U.S. PATENT DOCUMENTS

2003/0225815 A1 12/2003 Brenner et al.
2006/0195508 A1 8/2006 Bernardin et al.
(Continued)

OTHER PUBLICATIONS

International Search Report dated Jul. 19, 2017, in International Application No. PCT/IB2017/051618; 2 pages.
(Continued)

*Primary Examiner* — Qing Chen
(74) *Attorney, Agent, or Firm* — Finnegan, Henderson, Farabow, Garrett & Dunner LLP

(57) ABSTRACT

Systems and methods of scheduling tasks and managing computing resource allocation in a closed loop control system is provided. The system uses historical run-time statistics that includes expected run-time ($\mu$) and standard-deviation ($\sigma$) in run-times, of the tasks. The run-time statistics are used by the system to first predictively allocate and then to order the execution of the tasks in order to minimize the make-span. The schedule predicted is a queue of tasks to be executed on each computing resource ordered by a function of the expected run-time ($\mu$) and standard-deviation ($\sigma$). Reactive scheduling involves periodically probing the progress and reacting to imbalances in progress across computing resources by switching tasks between lagging and leading computing resources.

18 Claims, 6 Drawing Sheets

(58) Field of Classification Search
USPC .................................................. 718/102–105
See application file for complete search history.

(56) References Cited

U.S. PATENT DOCUMENTS

| | | | |
|---|---|---|---|
| 2011/0035751 A1* | 2/2011 | Krishnakumar | G06F 9/4881 |
| | | | 718/103 |
| 2011/0131448 A1 | 6/2011 | Vasil et al. | |
| 2013/0139176 A1* | 5/2013 | Kang | G06F 9/5083 |
| | | | 718/105 |
| 2013/0185521 A1* | 7/2013 | Kurihara | G06F 9/5027 |
| | | | 711/146 |

OTHER PUBLICATIONS

Written Opinion dated Jul. 19, 2017, in International Application No. PCT/IB2017/051618; 5 pages.

* cited by examiner

| Data set | Number of Tasks (# Tasks) | μ (in milliseconds) |
|---|---|---|
| Data set (500 Tasks) | 182<br>100<br>102<br>86<br>30 | U (10, 20)<br>U (20, 40)<br>U (40, 100)<br>U (100, 250)<br>U (250, 750) |

FIG. 4

SYSTEMS AND METHODS FOR SCHEDULING TASKS AND MANAGING COMPUTING RESOURCE ALLOCATION FOR CLOSED LOOP CONTROL SYSTEMS

PRIORITY CLAIM

This application is a U.S. National Stage Filing under 35 U.S.C. § 371 and claims priority from International Application No. PCT/IB2017/051618, filed on Mar. 21, 2017, which application claims priority under 35 U.S.C. § 119 from India Application No. 201621041855, filed on Dec. 7, 2016. The entire contents of the aforementioned application are incorporated herein by reference.

TECHNICAL FIELD

The disclosure herein generally relate to closed loop control systems, and, more particularly, to systems and methods for scheduling tasks and managing computing resources allocation for closed loop control systems.

BACKGROUND

Large closed loop control systems have many components that run as tasks in groups in a cyclic manner. An example of such a system is an automated Computer Aided Dispatcher for Railway Networks. Such control systems manage environments often with hundreds of components in several groups and where the tasks for these components arrive concurrently. Tasks in a group are independent. These complete their computation and release the resources held, if any, before the tasks in the next group run.

As tasks in such closed loop control systems run again and again in a cyclic manner, the control systems can easily collect and maintain a history of run-times of the tasks (average processing time $\mu$ and standard deviation $\sigma$) with very little overheads. However, Operating System (OS) does not use such a history of run-times for the purpose of scheduling tasks. OS scheduler typically, for example the LINUX Completely Fair Scheduler, uses priority of tasks and tries to be fair to them by allowing them to run for small intervals of time (time-slice) at a time and modifying subsequent time-slices for each task depending on the CPU-time consumed by a task and its priority.

Several attempts/researches have been made to schedule and run tasks using heuristics in an efficient manner. Research paper authored by J. N. D. GUPTA and A. J. RUIZ-TORRES, published in 2001 (hereinafter referred as Gupta et. al.), describes three known bin-packing based heuristics and a new heuristic in A LISTFIT heuristic for minimizing make span on identical parallel machines, Production Planning & Control: The Management of Operations. Another research paper authored by Laha and Behera (hereinafter referred as Laha et. al.) in 2015 provides a comprehensive review of the heuristics described in the paper authored by Gupta et. al. and presents an experimental framework to investigate performance of these heuristics. Another research paper authored by Lee et. al. in 2005 proposed using LPT heuristic, generation of a schedule and then using simulated annealing to improve on it in-order to generate a near-optimal solution. Cossari et. al. published in 2011 describes an algorithm for multiprocessor scheduling problem with the objective of minimizing the normalized sum of square for workload deviations (NSSWD). Gregg et. al. published in 2011 presents a method for dynamically scheduling applications running on heterogeneous platforms (multi-core CPU and many-core GPU) in order to maximize overall throughput. Their method estimates when an application would finish execution on a given resource based on historical run-time information. All the above methods make use of the expected processing time ($\mu$) of the tasks to create a predictive un-ordered list. However, in reality, there would be differences between the actual run-times and expected processing time ($\mu$). When the deviations are large, the actual make-spans generated by these heuristics can be significantly larger than expectations due to possible imbalances over the parallel machines.

SUMMARY

Embodiments of the present disclosure present technological improvements as solutions to one or more of the above-mentioned technical problems recognized by the inventors in conventional systems. For example, in one aspect, a method for scheduling tasks and managing computing resource allocation is provided. The method comprising: obtaining simultaneously, by a controller, a plurality of tasks of a closed loop control system to be executed in parallel on a plurality of computing resources; obtaining, by the controller, from a persistent database, for each of the plurality of tasks, historical run-time statistics of each of the plurality of tasks executed in one or more previous cycles, wherein the historical run-time statistics comprise (a) an expected run-time ($\mu$) and (b) a standard deviation ($\sigma$) of actual run-times in previous cycles; heuristically allocating the plurality of tasks to the plurality of computing resources based on (i) expected run-time ($\mu$), or (ii) the expected run-time ($\mu$) and the standard deviation ($\sigma$); generating a plan of a plurality of queues of the plurality of tasks for execution, by ordering the plurality of tasks, allocated to each of the plurality of computing resources, based on (i) the standard deviation ($\sigma$), or (ii) the expected run-time ($\mu$) and the standard deviation ($\sigma$) and sending to the operating system (OS) the plurality of tasks in the plurality of queues for execution on the computing resources to which the plurality of tasks were allocated, based on the generated plan when the computing resource to which a task is allocated completes the execution of a previous task in a queue; periodically monitoring, at configurable pre-defined intervals, relative progress of the execution of the plurality of tasks from the plurality of the queues of the plurality of the computing resources; determining one or more deviations in the relative progress of execution of the plurality of tasks in the plurality of queues across the plurality of allocated computing resources to which the tasks were allocated; reactively and dynamically balancing the loads on the computing resources, using (i) the expected run-time ($\mu$), or (ii) the expected run-time ($\mu$) and the standard deviation ($\sigma$), based on the one or more deviations, by shifting at least a subset of zero or more tasks that are waiting to be sent to the OS for execution between a first queue and a second queue based on a progress of the first queue and the second queue, and repeating the step of shifting between subsequent queues until a last pair of queues are balanced, and re-ordering one or more tasks in each queue. In an embodiment, the step of shifting at least a subset of zero or more tasks comprises shifting zero or more tasks to be executed on an allocated computing resource to the queue of another resource for execution based on (i) remaining time of tasks that are being executed on the one or more allocated computing resources and (ii) an estimated run-time ($\mu$) or estimated run-time ($\mu$) and the standard deviation ($\sigma$) of tasks that are waiting to be dispatched in each of one or more queues for execution. The method further comprises updating run time statistics of the plurality of tasks based on actual runtimes measured in a current execution and storing the updated run time statistics in the persistent database.

In an embodiment, the one or more tasks are allocated for execution on the plurality of computing resources based on a function of the expected run-time ($\mu$) or (ii) the expected run-time ($\mu$) and the standard deviation ($\sigma$). In an embodiment, a plan is generated for execution of a plurality of queues of the plurality of tasks, by ordering the plurality of tasks allocated to each of the plurality of computing resources based on (i) the standard deviation ($\sigma$), or (ii) the expected run-time ($\mu$) and the standard deviation ($\sigma$). In an embodiment, one or more tasks are released for execution on an allocated computing resource based on the generated plan.

In an embodiment, at the configurable pre-defined intervals, the relative progress of the execution of the plurality of tasks from the plurality of the queues of the plurality of the computing resource are monitored and the deviations in the progress of execution of the tasks are determined.

In another aspect, a system for scheduling tasks and managing resources allocation is provided. The system comprising: a memory storing instructions and data, wherein data may include information pertaining to tasks execution; one or more communication interfaces; one or more hardware processors, each consisting of one or more computing resources, communicatively coupled to the memory; and a controller configured with instructions stored in the memory to: simultaneously obtain a plurality of tasks of a closed loop control system to be executed in parallel on a plurality of computing resources; obtain from a persistent database, for each of the plurality of tasks, historical run-time statistics of each of the plurality of tasks executed in one or more previous cycles, wherein the historical run-time statistics comprise (a) an expected run-time ($\mu$) and (b) a standard deviation ($\sigma$) of actual run-times in previous cycles, heuristically allocate the plurality of tasks to the plurality of computing resources based on (i) expected run-time ($\mu$), or (ii) the expected run-time ($\mu$) and the standard deviation ($\sigma$), generate a plan of a plurality of queues of the plurality of tasks for execution, by ordering the plurality of tasks, allocated to each of the plurality of computing resources, based on (i) the standard deviation ($\sigma$), or (ii) the expected run-time ($\mu$) and the standard deviation ($\sigma$) and sending to the operating system (OS) the plurality of tasks in the plurality of queues for execution on the computing resources to which the plurality of tasks were allocated, based on the generated plan when the computing resource to which a task is allocated completes the execution of a previous task in a queue, periodically monitor, at configurable pre-defined intervals, relative progress of the execution of the plurality of tasks from the plurality of the queues of the plurality of the computing resources, determine one or more deviations in the relative progress of execution of the plurality of tasks in the plurality of queues across the plurality of allocated computing resources to which the tasks were allocated, reactively and dynamically balance the loads on the computing resources, using (i) the expected run-time ($\mu$), or (ii) the expected run-time ($\mu$) and the standard deviation ($\sigma$), based on the one or more deviations, by shifting at least a subset of zero or more tasks that are waiting to be sent to the OS for execution between a first queue and a second queue based on a progress of the first queue and the second queue, and repeating the step of shifting between subsequent queues until a last pair of queues are balanced, and re-ordering one or more tasks in each queue. In an embodiment, the step of shifting at least a subset of zero or more tasks comprising shifting zero or more tasks to be executed on an allocated computing resource to the queue of another resource for execution based on (i) remaining time of tasks that are being executed on the one or more allocated computing resources and (ii) an estimated run-time ($\mu$) or estimated run-time ($\mu$) and the standard deviation ($\sigma$) of tasks that are waiting to be dispatched in each of one or more queues for execution. The system is further configured to update run time statistics of the plurality of tasks based on actual runtimes measured in a current execution and storing the updated run time statistics in the persistent database.

In an embodiment, the one or more tasks are allocated for execution on the plurality of computing resources based on a function of the expected run-time ($\mu$) or (ii) the expected run-time ($\mu$) and the standard deviation ($\sigma$).

In an embodiment, a plan is generated for execution of a plurality of queues of the plurality of tasks, by ordering the plurality of tasks allocated to each of the plurality of computing resources based on (i) the standard deviation ($\sigma$), or (ii) the expected run-time ($\mu$) and the standard deviation ($\sigma$).

In an embodiment, one or more tasks are released for execution on an allocated computing resource based on the generated plan.

In an embodiment, at the configurable pre-defined intervals, the relative progress of the execution of the plurality of tasks from the plurality of the queues of the plurality of the computing resource are monitored and the deviations in the relative progress of execution of the tasks are determined.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 depicts a table illustrating sample input data-set by way of examples that were used for the performance testing according to an embodiment of the present disclosure.

DETAILED DESCRIPTION

Figure 1:
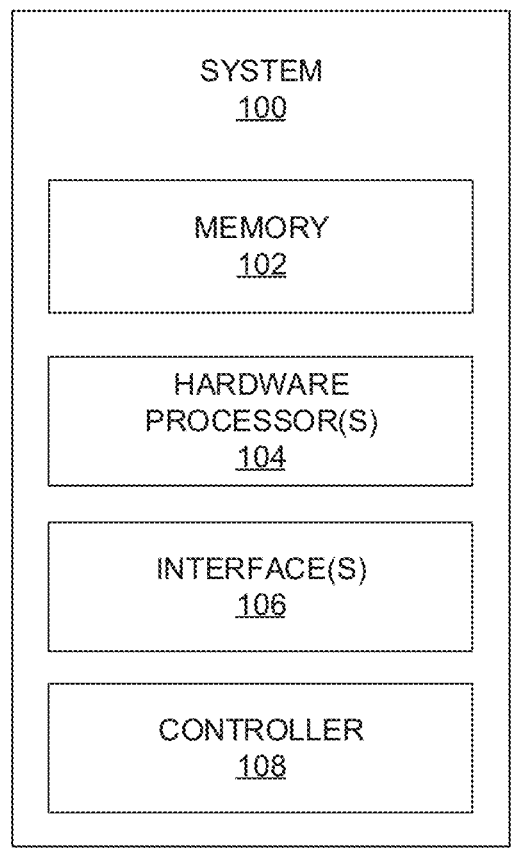
FIG. 1 illustrates an exemplary block diagram of a system for scheduling tasks and managing computing resource allocation according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for scheduling tasks and managing computing resource allocation according to an embodiment of the present disclosure. In an embodiment, the system 100 includes one or more processors 104, communication interface device(s) or input/output (I/O) interface(s) 106, one or more data storage devices or memory 102 operatively coupled to the one or more processors 104, and a controller 108. The one or more processors 104 consist of one or more computing resource. Among other capabilities, the processor(s) is configured to fetch and execute computer-readable instructions stored in the memory. In an embodiment, the system 100 can be implemented in a variety of computing systems, such as workstations, servers, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102. The controller 108 is configured with instructions stored in the memory to perform one or more functionalities.

Figure 2A:
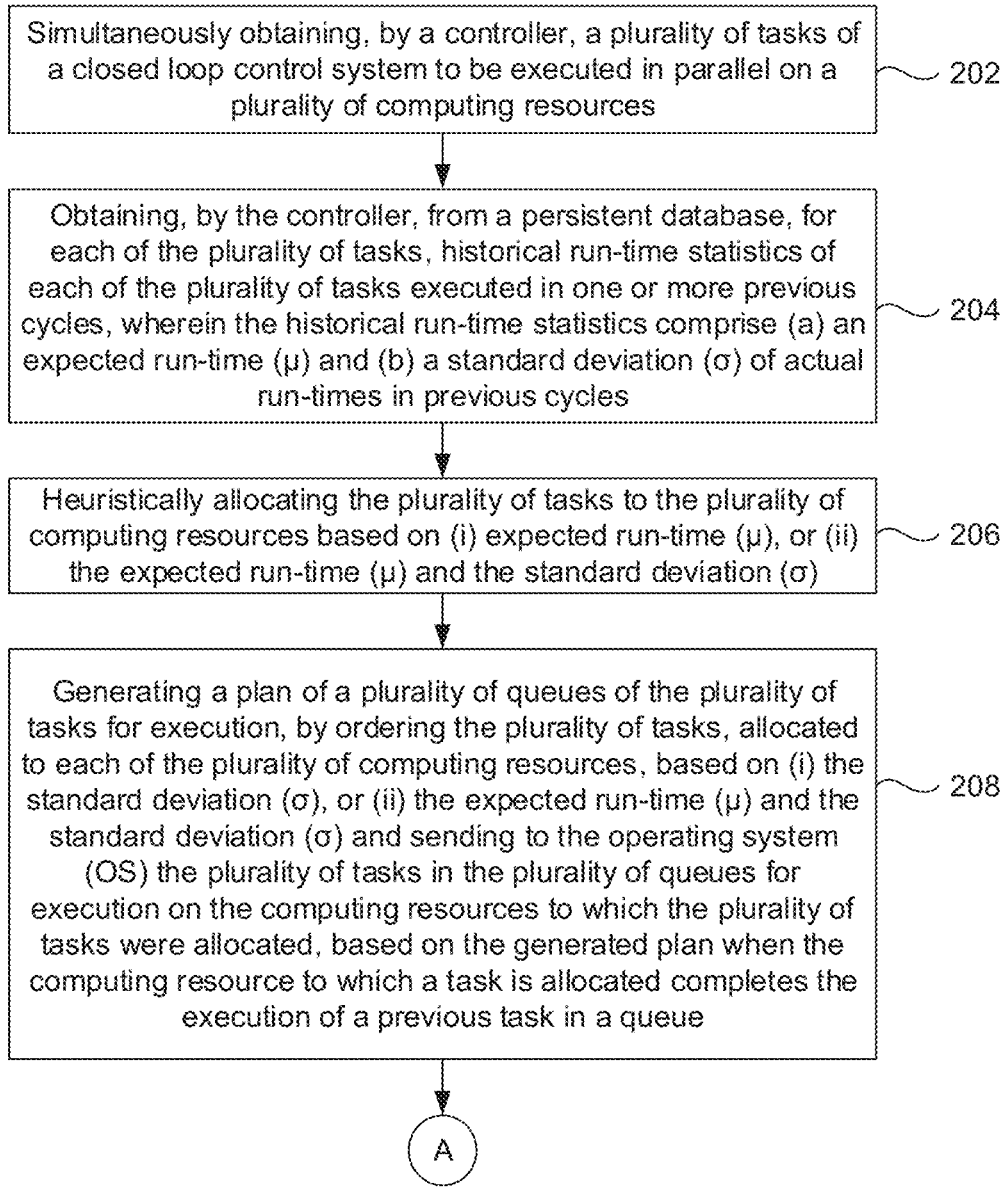
FIGS. 2A and 2B illustrate an exemplary flow diagram of a processor implemented method for scheduling tasks and managing computing resource allocation according to an embodiment of the present disclosure.
Figure 2B:
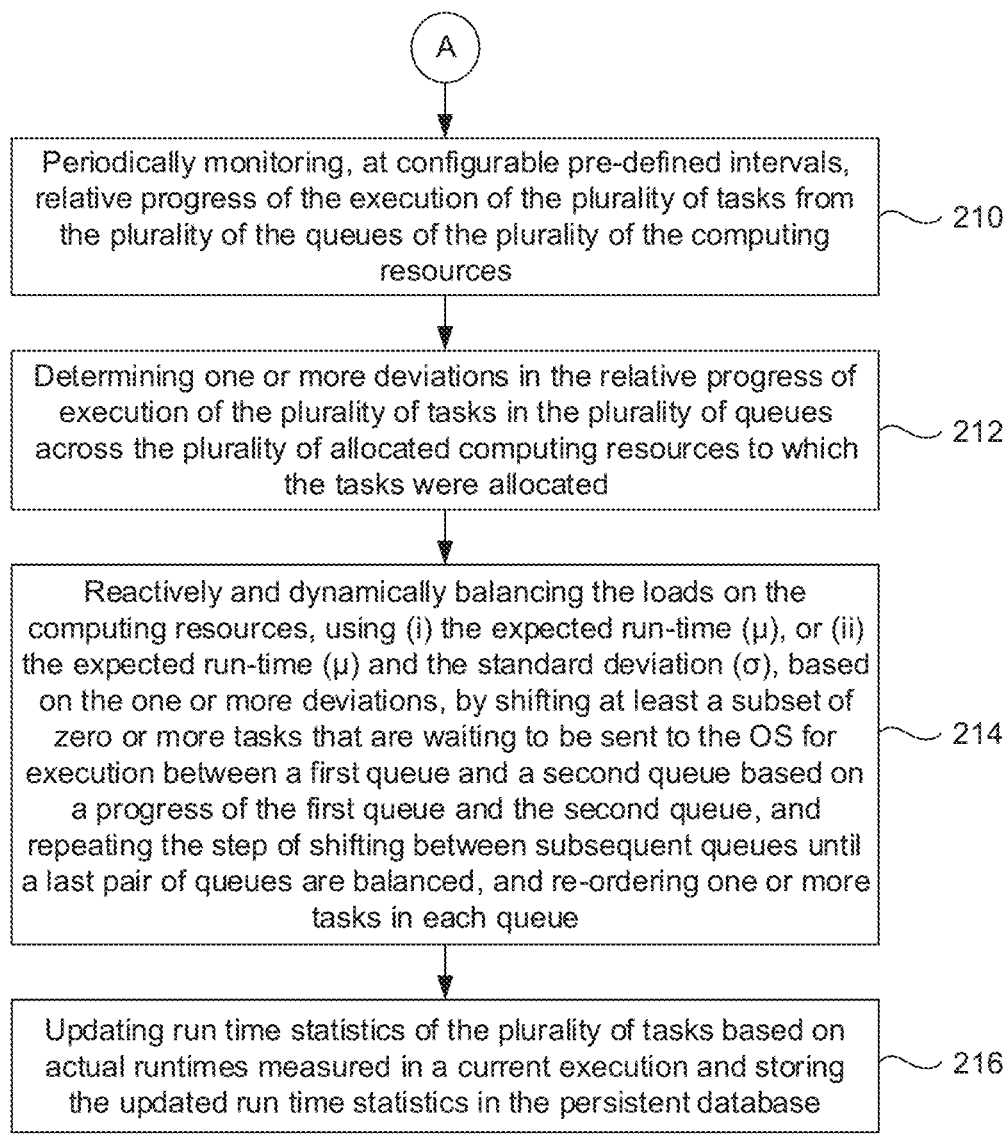

FIGS. 2A and 2B, with reference to FIG. 1, illustrate an exemplary flow diagram of a processor implemented method for scheduling tasks and managing resources allocation using the system 100 to an embodiment of the present disclosure. In an embodiment, the system 100 comprises one or more data storage devices or the memory 102 operatively coupled to the one or more hardware processors 104, wherein each hardware processor consists of one or more computing resources, and wherein the one or more hardware processors 104 are configured to store instructions for execution of steps of the method by the controller 108. The steps of the method of the present disclosure will now be explained with reference to the components of the system 100 as depicted in FIG. 1, and the flow diagram. In an embodiment of the present disclosure, at step 202, the controller 108 simultaneously obtains a plurality of tasks of a closed loop control system to be executed in parallel (and in minimal time) on one or more computing resources in one or more processors.

Figure 3:
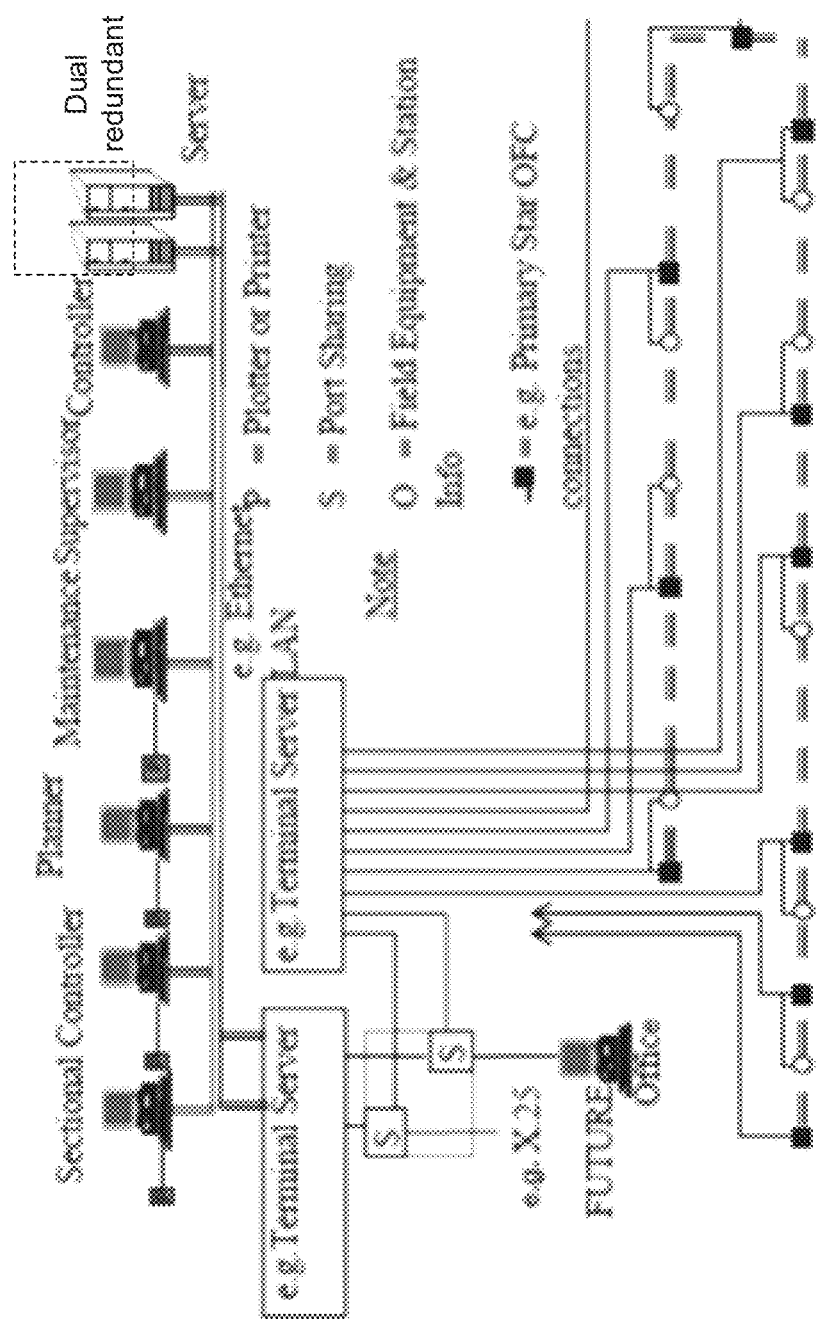
FIG. 3 illustrates a control center layout and a connection of the control center to a field, in accordance with an exemplary embodiment of the present subject matter.

In an embodiment of the present disclosure, a closed loop control system, for example, may be an automated Computer Aided Dispatcher used to dispatch trains on a large size countrywide railway network. Such large network comprises a plurality of sub-networks, wherein each sub-system of the Computer Aided Dispatcher has a sub-controller that controls one or more components of the sub-system. FIG. 3 illustrates a control center layout and a connection of the control center to a field traffic supervisory control and data acquisition (SCADA) network, in accordance with an exemplary embodiment of the present subject matter. The controller of the closed loop control system controls one or more sub-controllers of each sub-system. FIG. 3 illustrates a control center layout and a connection of the control center to the field traffic SCADA network and hardware used in implementation of system 100 in an exemplary embodiment of the disclosure. Hardware components for the control center may only use commercially available equipment. In one example, a minimum of three workstations may be used at each control site for two PLANNERS/CONTROLLERS and a MAINTENANCE workstation that communicates over a LAN to a possibly a dual redundant server for fault tolerance. The system 100 may be installed on one or more such servers. The dual redundant servers in FIG. 3 are where the sub-controllers of each subsystem are scheduled and executed. These are multi-processor systems on which independent copies of the system 100 may be implemented. Display systems are typically run on different workstations for human dispatchers/planners/controllers as depicted in the FIG. 3. The maintenance workstation monitors performance of the control center including the servers, software workstations, displays and communication network (dual Ethernet LAN). The maintenance workstation may also be used as a planner/controller position backup. The functions available in the control center may be controlled by password entry. Moreover, additional workstations can be added to the control center any time. The nature and configurations of the hardware and communications components and user roles as depicted in FIG. 3 are merely indicative. The system is used, for example, for vehicle movement modeling in a large size railway network. The system provides automated Computer Aided Dispatching of vehicles/trains in the railway network. The system ensures traffic flow efficiency and the absence of conflicts in vehicle movements in the railway network. Further, workstations in the control centre may also generate graphs and visual layouts of vehicle/trains movement over the railway network. The figure illustrates Terminal Servers being used to connect to possible serial devices or parallel devices in the field. Alternate devices like routers, switches and hubs may be used to connect to other and more types of field devices and external systems.

Referring back to FIG. 2A, in an embodiment of the present disclosure, at step 204, the controller 108 obtains from a persistent database, for each of the plurality of tasks, historical run-time statistics of each of the plurality of tasks executed in one or more previous cycles, wherein the historical run-time statistics comprise (a) an expected run-time ($\mu$) and (b) a standard deviation ($\sigma$) of actual run-times in previous cycles. In an embodiment, the persistence database is either stored in the memory 102, or resides in an external device (e.g., server or external computer system). In an embodiment, the historical run-time statistics comprise (a) an expected run-time ($\mu$) and (b) a standard deviation ($\sigma$) of actual run-times in previous cycles. In an embodiment of the present disclosure, at step 206, the controller 108 heuristically allocates the plurality of tasks to the plurality of computing resources based on (i) expected run-time (μ), or (ii) the expected run-time (μ) and the standard deviation (σ).

In an embodiment of the present disclosure, at step 208, the controller 108 generates a plan of a plurality of queues of the plurality of tasks for execution, by ordering the plurality of tasks, allocated to each of the plurality of computing resources, based on (i) the standard deviation (σ), or (ii) the expected run-time (μ) and the standard deviation (σ) and sends to the operating system (OS) the plurality of tasks in the plurality of queues for execution on the computing resources to which the plurality of tasks were allocated, based on the generated plan when the computing resource to which a task is allocated completes the execution of a previous task in a queue. In order words, the one or more tasks are sorted and put in an order based on the (i) standard deviation (σ), or (ii) a function of the standard deviation (σ) and the expected run-time (μ). In an embodiment of the present disclosure, at step 210, the controller 108 periodically monitors, at configurable pre-defined intervals, relative progress of the execution of the plurality of tasks from the plurality of the queues of the plurality of the computing resources.

In an embodiment of the present disclosure, at step 212, the controller 108 determines one or more deviations in the relative progress of execution of the plurality of tasks in the plurality of queues across the plurality of computing resources to which the tasks were allocated. In other words, at the configurable pre-defined intervals, the relative progress of the execution of the plurality of tasks from the plurality of the queues of the plurality of the computing resource are monitored and the deviations in the progress of execution of the tasks are determined. In an embodiment of the present disclosure, at step 214, the loads on the computing resources are reactively and dynamically balanced, using (i) the expected run-time (μ), or (ii) the expected run-time (μ) and the standard deviation (σ), based on the one or more deviations, by shifting at least a subset of zero or more tasks that are waiting to be sent to the OS for execution between a first queue and a second queue based on a progress of the first queue and the second queue, and the step of shifting is repeated between subsequent queues until a last pair of queues are balanced, and one or more tasks in each queue are reordered. In other words, the loads of the computing resources are reactively and dynamically balanced by shifting at least a subset of zero or more tasks that are waiting to be sent to the OS for execution between a queue whose progress is slowest and another queue whose progress is the fastest, till no further improvement in load balance is possible, and this step of shifting of tasks is repeated between the next slowest and the next fastest pair of queues until all such pairs of queues are balanced, followed by re-ordering the plurality of tasks in each queue based on the same policy used for generating the initial plan. For example, if there are two (2) queues (e.g., queue A and B), each queue comprising 7 and 8 tasks respectively. If the controller 108 identifies that the tasks in the queue B are getting executed quickly in comparison to tasks in queue A, then some tasks may be shifted between queue A and queue B so that the load on the respective computing resources get balanced.

In an embodiment of the present disclosure, the step of shifting at least a subset of zero or more tasks comprises shifting zero or more tasks to be executed on an allocated computing resource to a queue of another computing resource for execution based on (i) remaining time of tasks that are being executed on the one or more allocated computing resources and (ii) an estimated run-time (μ) or estimated run-time (μ) and the standard deviation (σ) of tasks that are waiting to be dispatched in each of one or more queues for execution. In an embodiment, in this reactive load-balancing step, tasks may be moved from one computing resource to another, none in the other direction, or no shifting of tasks from a resource to another may occur if shifting does not improve the balance, and upon execution of all tasks from the queues across the computing resources, runtime statistics measured in a current execution are updated and stored in the persistent database. In an embodiment of the present disclosure, the expressions 'shifting', 'switching' and 'moving' may be interchangeably used.

In an embodiment of the present disclosure, one or more tasks are allocated for execution on the plurality of computing resources based on a function of the expected run-time (μ) or (ii) the expected run-time (μ) and the standard deviation (σ). In another embodiment of the present disclosure, a plan is generated for execution of a plurality of queues of the plurality of tasks, by ordering the plurality of tasks allocated to each of the plurality of computing resources based on (i) the standard deviation (σ), or (ii) the expected run-time (μ) and the standard deviation (σ).

In an embodiment of the present disclosure, one or more tasks are released for execution on an allocated computing resource based on the generated plan. The tasks that are yet to be released by the controller 108 are considered for movement to another processor in the reactive balance step. Tasks that have already started execution may not be moved. This ensures proper balancing across computing resources and is based on (i) remaining time of tasks that are being executed on the one or more allocated resources and (ii) an estimated run-time of tasks that are waiting to be dispatched in each of the one or more queues for execution. Tasks are moved from one queue to another so that the sum of (i) and (ii) in the two queues involved are balanced. In an embodiment of the present disclosure, at step 216, run time statistics of the plurality of tasks are updated based on actual runtimes measured in a current execution and the updated run time statistics are stored in the persistent database.

Below is computational experimental data that are illustrated by way of examples of the above method in comparison to traditional systems and methods:

Computational Experiments:

A single-threaded Controller was evaluated on an Intel® Xeon® CPU E5-2650 v3 @ 2.30 GHz server—2 processors with 10 cores each, 25 MB L3 Cache, 64 GB RAM running Linux 3.10.0 (CentOS 7 distribution). The following performance parameters were measured for tasks with high (σ/μ) values:

1) Actual make-span with the controller 108 running in a reactive manner as described in FIGS. 2A and 2B, and the preceding paragraphs. Here the controller 108 maintained a separate queue of tasks for each core.
2) Actual make-span with the controller 108 running in a non-reactive manner in two modes:
    a. the controller 108 maintained a separate queue of tasks for each core like default Linux OS.
    b. the controller 108 maintained a single queue of tasks. Here the task at the head of the queue is released on the first core that became free.

FIG. 4 depicts a Table illustrating sample input data-set by way of examples that were used for the performance testing. More specifically, FIG. 4 shows a distribution of 500 sample CPU intensive tasks that were used for performance testing. In FIG. 4, U(x, y) denote uniform distribution between x and y. For example U(10,20) means μ values are uniformly distributed between 10 milliseconds and 20 milliseconds. The run-times for these tasks were estimated by measuring the run-times of line schedulers in a sub-network of Indian Railways and extrapolating these run-times for 500 lines. 'σ' of each task was kept at 1.5*μ, and then randomized between −50% to +50%.

Figure 5:
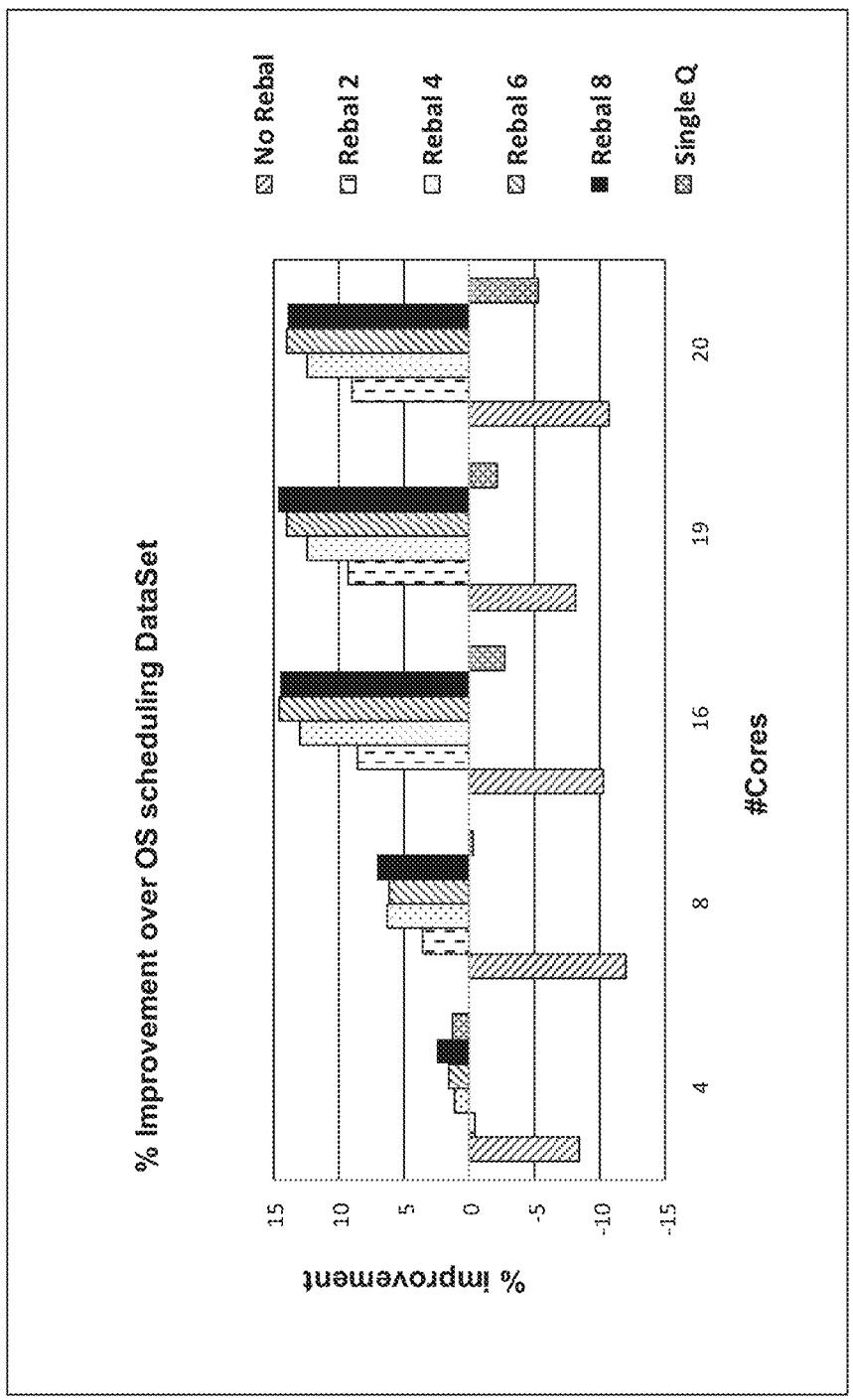
FIG. 5 depicts a graphical representation illustrating percentage improvement in make-spans when scheduled by the controller versus when the scheduling was done by the Operating System (OS) according to an embodiment of the present disclosure.

FIG. 5, with reference to FIGS. 1 through 4, depicts a graphical representation illustrating percentage improvement in make-spans when scheduled by the controller 108 versus when the scheduling was done by the OS according to an embodiment of the present disclosure. More particularly, FIG. 5, depicts a graphical representation illustrating percentage improvement in make-span with (average σ/μ=1.5), and tasks ordered in the queues by a. In FIG. 5, No Rebal indicates no reactive change in schedule was done by the controller 108, Rebal X indicates X number of probes and reactive change in schedule, Single Q indicates that the controller 108 maintains a single queue of tasks ordered by decreasing p with no reactive change in schedule.

The following were observed:
1) Scheduling by the OS results in better make-spans than the one by the controller 108 operating in predictive (non-reactive) mode. This is due to better utilization of computing resources by the OS compared to that by the controller 108 using LPT heuristics. Due to high σ, the actual run-times are significantly different from the estimated ones (μ). The plan predicted by the controller 108, therefore, will not be optimal. The OS does a better job in this case as it does dynamic load-balancing resulting in better computing resource utilization compared to that by the predictive scheduler.
2) Probing and re-balancing gives better make-spans when large number of computing resources [>4] are available.
3) Using a single queue of tasks results in smaller make-spans compared to that by reactive-scheduler when few computing resources are available.

With more computing resources, probing and dynamic re-balancing consistently gives better results. Load-balancing by the OS or by reactive scheduler generally utilizes the computing resources better.

When there are significant expected deviations in run-times (high σ/μ), reactive scheduler outperforms both the OS and the predictive only scheduler when more computing resources are available. The overheads of probing and adjusting the schedule are low. Use of such customized efficient controllers allows the systems to be run on computers with fewer computing resources thereby reducing the cost of computing hardware required to run the systems in a redundant manner, or can reduce the cycle time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server. The hardware device can be any kind of device which can be programmed including e.g. any kind of computer like a server or a personal computer, or the like, or any combination thereof. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

We claim:

1. A method for scheduling tasks and managing computing resource allocation, comprising:

simultaneously obtaining, by a controller, a plurality of tasks of a closed loop control system to be executed in parallel on a plurality of computing resources;

obtaining, by the controller, from a persistent database, for each task of the plurality of tasks, historical run-time statistics of each task of the plurality of tasks executed in one or more previous cycles, wherein the historical run-time statistics comprise (a) an expected run-time ($\mu$) and (b) a standard deviation ($\sigma$) of actual run-times in the one or more previous cycles;

heuristically allocating, by the controller, the plurality of tasks to the plurality of computing resources for execution based on (i) the expected run-time ($\mu$), or (ii) the expected run-time ($\mu$) and the standard deviation ($\sigma$) of the actual run-times in the one or more previous cycles;

generating, by the controller, a plan of a plurality of queues of the plurality of tasks for execution, by ordering the plurality of tasks, heuristically allocated to each computing resource of the plurality of computing resources, based on (i) the standard deviation ($\sigma$) of the actual run-times in the one or more previous cycles, or (ii) the expected run-time ($\mu$) and the standard deviation ($\sigma$) of the actual run-times in the one or more previous cycles and sending to an operating system (OS) the plurality of tasks in the plurality of queues for execution on the plurality of computing resources to which the plurality of tasks were heuristically allocated, based on the generated plan of the plurality of queues of the plurality of tasks for execution when the computing resource to which a task is heuristically allocated completes execution of a previous task in a queue of one or more queues;

periodically monitoring, by the controller and at configurable pre-defined intervals, relative progress of the execution of the plurality of tasks in the plurality of queues of the plurality of computing resources;

determining, by the controller, one or more deviations in the relative progress of the execution of the plurality of tasks in the plurality of queues across the plurality of computing resources to which the plurality of tasks were heuristically allocated;

reactively and dynamically balancing, by the controller, loads on the plurality of computing resources, using (i) the expected run-time ($\mu$), or (ii) the expected run-time ($\mu$) and the standard deviation ($\sigma$) of the actual run-times in the one or more previous cycles, based on the one or more deviations in the relative progress of the execution of the plurality of tasks, by shifting at least a subset of zero or more tasks that are waiting to be sent to the OS for execution between a first queue and a second queue based on a progress of the first queue and the second queue, and repeating the shifting at least the subset of zero or more tasks that are waiting to be sent to the OS for execution between subsequent queues until a last pair of queues are balanced, and re-ordering one or more tasks in each queue of one or more queues; and updating, by the controller, run-time statistics of the plurality of tasks based on actual run-times measured in a current execution and storing the updated run-time statistics of the plurality of tasks in the persistent database.

2. The method of claim 1, wherein the one or more tasks are heuristically allocated for execution on the plurality of computing resources based on a function of (i) the expected run-time ($\mu$), or (ii) the expected run-time ($\mu$) and the standard deviation ($\sigma$) of the actual run-times in the one or more previous cycles.

3. The method of claim 1, wherein a plan is generated for execution of a plurality of queues of the plurality of tasks, by ordering the plurality of tasks allocated to each computing resource of the plurality of computing resources based on (i) the standard deviation ($\sigma$) of the actual run-times in the one or more previous cycles, or (ii) the expected run-time ($\mu$) and the standard deviation ($\sigma$) of the actual run-times in the one or more previous cycles.

4. The method of claim 1, wherein one or more tasks are released for execution on an allocated computing resource based on the generated plan of the plurality of queues of the plurality of tasks for execution.

5. The method of claim 1, wherein, at the configurable pre-defined intervals, the relative progress of the execution of the plurality of tasks in the plurality of queues of the plurality of computing resources are monitored and the one or more deviations in the relative progress of the execution of the plurality of tasks in the plurality of queues across the plurality of computing resources to which the plurality of tasks were heuristically allocated are determined.

6. The method of claim 1, wherein the shifting at least the subset of zero or more tasks that are waiting to be sent to the OS for execution comprises shifting zero or more tasks to be executed on an allocated computing resource to a queue of another computing resource for execution based on (i) remaining time of one or more tasks that are being executed on one or more allocated computing resources and (ii) an estimated run-time ($\mu$), or the estimated run-time ($\mu$) and the standard deviation ($\sigma$) of the actual run-times in the one or more previous cycles of one or more tasks that are waiting to be dispatched in each queue of one or more queues for execution.

7. A system for scheduling tasks and managing computing resource allocation, comprising:
a memory storing instructions;
one or more communication interfaces;
one or more hardware processors communicatively coupled to the memory, wherein each hardware processor of the one or more hardware processors consists of one or more computing resources; and
a controller configured with the instructions stored in the memory to:
simultaneously obtain a plurality of tasks of a closed loop control system to be executed in parallel on a plurality of computing resources;
obtain, from a persistent database, for each task of the plurality of tasks, historical run-time statistics of each task of the plurality of tasks executed in one or more previous cycles, wherein the historical run-time statistics comprise (a) an expected run-time ($\mu$) and (b) a standard deviation ($\sigma$) of actual run-times in the one or more previous cycles;
heuristically allocate the plurality of tasks to the plurality of computing resources for execution based on (i) the expected run-time ($\mu$), or (ii) the expected run-time ($\mu$) and the standard deviation ($\sigma$) of the actual run-times in the one or more previous cycles;
generate a plan of a plurality of queues of the plurality of tasks for execution, by ordering the plurality of tasks, heuristically allocated to each computing resource of the plurality of computing resources, based on (i) the standard deviation ($\sigma$) of the actual run-times in the one or more previous cycles, or (ii) the expected run-time ($\mu$) and the standard deviation (σ) of the actual run-times in the one or more previous cycles and sending to an operating system (OS) the plurality of tasks in the plurality of queues for execution on the plurality of computing resources to which the plurality of tasks were heuristically allocated, based on the generated plan of the plurality of queues of the plurality of tasks for execution when the computing resource to which a task is heuristically allocated completes execution of a previous task in a queue of one or more queues;

periodically monitor, at configurable pre-defined intervals, relative progress of the execution of the plurality of tasks in the plurality of queues of the plurality of computing resources;

determine one or more deviations in the relative progress of the execution of the plurality of tasks in the plurality of queues across the plurality of computing resources to which the plurality of tasks were heuristically allocated;

reactively and dynamically balance loads on the plurality of computing resources, using (i) the expected run-time (μ), or (ii) the expected run-time (μ) and the standard deviation (σ) of the actual run-times in the one or more previous cycles, based on the one or more deviations in the relative progress of the execution of the plurality of tasks, by shifting at least a subset of zero or more tasks that are waiting to be sent to the OS for execution between a first queue and a second queue based on a progress of the first queue and the second queue, and repeating the shifting at least the subset of zero or more tasks that are waiting to be sent to the OS for execution between subsequent queues until a last pair of queues are balanced, and re-ordering one or more tasks in each queue of one or more queues; and update run-time statistics of the plurality of tasks based on actual run-times measured in a current execution and storing the updated runtime statistics of the plurality of tasks in the persistent database.

8. The system of claim 7, wherein the one or more tasks are heuristically allocated for execution on the plurality of computing resources based on a function of (i) the expected run-time (μ), or (ii) the expected run-time (μ) and the standard deviation (σ) of the actual run-times in the one or more previous cycles.

9. The system of claim 7, wherein a plan is generated for execution of a plurality of queues of the plurality of tasks, by ordering the plurality of tasks allocated to each computing resource of the plurality of computing resources based on (i) the standard deviation (σ) of the actual run-times in the one or more previous cycles, or (ii) the expected run-time (μ) and the standard deviation (σ) of the actual run-times in the one or more previous cycles.

10. The system of claim 7, wherein one or more tasks are released for execution on an allocated computing resource based on the generated plan of the plurality of queues of the plurality of tasks for execution.

11. The system of claim 7, wherein, at the configurable pre-defined intervals, the relative progress of the execution of the plurality of tasks in the plurality of queues of the plurality of computing resources are monitored and the one or more deviations in the relative progress of the execution of the plurality of tasks in the plurality of queues across the plurality of computing resources to which the plurality of tasks were heuristically allocated are determined.

12. The system of claim 7, wherein the shifting at least the subset of zero or more tasks that are waiting to be sent to the OS for execution comprises shifting zero or more tasks to be executed on an allocated computing resource to a queue of another computing resource for execution based on (i) remaining time of one or more tasks that are being executed on one or more allocated computing resources and (ii) an estimated run-time (μ), or the estimated run-time (μ) and the standard deviation (σ) of the actual run-times in the one or more previous cycles of one or more tasks that are waiting to be dispatched in each queue of one or more queues for execution.

13. One or more non-transitory computer-readable media storing one or more instructions which, when executed by one or more hardware processors, cause:

simultaneously obtaining, by a controller, a plurality of tasks of a closed loop control system to be executed in parallel on a plurality of computing resources;

obtaining, by the controller, from a persistent database, for each task of the plurality of tasks, historical run-time statistics of each task of the plurality of tasks executed in one or more previous cycles, wherein the historical run-time statistics comprise (a) an expected run-time (μ) and (b) a standard deviation (σ) of actual run-times in the one or more previous cycles;

heuristically allocating, by the controller, the plurality of tasks to the plurality of computing resources for execution based on (i) the expected run-time (μ), or (ii) the expected run-time (μ) and the standard deviation (σ) of the actual run-times in the one or more previous cycles;

generating, by the controller, a plan of a plurality of queues of the plurality of tasks for execution, by ordering the plurality of tasks, heuristically allocated to each computing resource of the plurality of computing resources, based on (i) the standard deviation (σ) of the actual run-times in the one or more previous cycles, or (ii) the expected run-time (μ) and the standard deviation (σ) of the actual run-times in the one or more previous cycles and sending to an operating system (OS) the plurality of tasks in the plurality of queues for execution on the plurality of computing resources to which the plurality of tasks were heuristically allocated, based on the generated plan of the plurality of queues of the plurality of tasks for execution when the computing resource to which a task is heuristically allocated completes execution of a previous task in a queue of one or more queues;

periodically monitoring, by the controller and at configurable pre-defined intervals, relative progress of the execution of the plurality of tasks in the plurality of queues of the plurality of computing resources;

determining, by the controller, one or more deviations in the relative progress of the execution of the plurality of tasks in the plurality of queues across the plurality of computing resources to which the plurality of tasks were heuristically allocated;

reactively and dynamically balancing, by the controller, loads on the plurality of computing resources, using (i) the expected run-time (μ), or (ii) the expected run-time (μ) and the standard deviation (σ) of the actual run-times in the one or more previous cycles, based on the one or more deviations in the relative progress of the execution of the plurality of tasks, by shifting at least a subset of zero or more tasks that are waiting to be sent to the OS for execution between a first queue and a second queue based on a progress of the first queue and the second queue, and repeating the shifting at least the subset of zero or more tasks that are waiting to be sent to the OS for execution between subsequent queues until a last pair of queues are balanced, and re-ordering one or more tasks in each queue of one or more queues; and updating, by the controller, run-time statistics of the plurality of tasks based on actual run-times measured in a current execution and storing the updated run-time statistics of the plurality of tasks in the persistent database.

14. The one or more non-transitory computer-readable media of claim 13, wherein the shifting at least the subset of zero or more tasks that are waiting to be sent to the OS for execution comprises shifting zero or more tasks to be executed on an allocated computing resource to a queue of another computing resource for execution based on (i) remaining time of one or more tasks that are being executed on one or more allocated computing resources and (ii) an estimated run-time ($\mu$), or the estimated run-time ($\mu$) and the standard deviation ($\sigma$) of the actual run-times in the one or more previous cycles of one or more tasks that are waiting to be dispatched in each queue of one or more queues for execution.

15. The one or more non-transitory computer-readable media of claim 13, wherein the one or more tasks are heuristically allocated for execution on the plurality of computing resources based on a function of (i) the expected run-time ($\mu$), or (ii) the expected run-time ($\mu$) and the standard deviation ($\sigma$) of the actual run-times in the one or more previous cycles.

16. The one or more non-transitory computer-readable media of claim 13, wherein a plan is generated for execution of a plurality of queues of the plurality of tasks, by ordering the plurality of tasks allocated to each computing resource of the plurality of computing resources based on (i) the standard deviation ($\sigma$) of the actual run-times in the one or more previous cycles, or (ii) the expected run-time ($\mu$) and the standard deviation ($\sigma$) of the actual run-times in the one or more previous cycles.

17. The one or more non-transitory computer-readable media of claim 13, wherein one or more tasks are released for execution on an allocated computing resource based on the generated plan of the plurality of queues of the plurality of tasks for execution.

18. The one or more non-transitory computer-readable media of claim 13, wherein, at the configurable pre-defined intervals, the relative progress of the execution of the plurality of tasks in the plurality of queues of the plurality of computing resources are monitored and the one or more deviations in the relative progress of the execution of the plurality of tasks in the plurality of queues across the plurality of computing resources to which the plurality of tasks were heuristically allocated are determined.

* * * * *